US011411693B2

(12) United States Patent
Chou

(10) Patent No.: US 11,411,693 B2
(45) Date of Patent: Aug. 9, 2022

(54) FIFTH GENERATION NEW RADIO UPLINK MULTIPLEXING ASSISTED BY SHARED GRANT-FREE TRANSMISSION

(71) Applicant: Google LLC, Mountain View, CA (US)

(72) Inventor: Kao-Peng Chou, Taipei (TW)

(73) Assignee: Google LLC, Mountain View, CA (US)

( * ) Notice: Subject to any disclaimer, the term of this patent is extended or adjusted under 35 U.S.C. 154(b) by 26 days.

(21) Appl. No.: 16/964,939

(22) PCT Filed: Apr. 1, 2019

(86) PCT No.: PCT/US2019/025228
§ 371 (c)(1),
(2) Date: Jul. 24, 2020

(87) PCT Pub. No.: WO2019/199515
PCT Pub. Date: Oct. 17, 2019

(65) Prior Publication Data
US 2020/0396034 A1 Dec. 17, 2020

Related U.S. Application Data

(60) Provisional application No. 62/654,967, filed on Apr. 9, 2018.

(51) Int. Cl.
*H04W 72/12* (2009.01)
*H04L 5/00* (2006.01)
*H04L 1/00* (2006.01)
*H04L 1/18* (2006.01)

(52) U.S. Cl.
CPC .......... *H04L 5/0046* (2013.01); *H04L 1/0061* (2013.01); *H04L 1/0068* (2013.01);
(Continued)

(58) Field of Classification Search
None
See application file for complete search history.

(56) References Cited

U.S. PATENT DOCUMENTS

2009/0150736 A1* 6/2009 Nebat ................... H03M 13/09
714/748
2011/0154159 A1* 6/2011 Tanaka ................ H03M 13/091
714/E11.03
(Continued)

FOREIGN PATENT DOCUMENTS

JP 2016533085 10/2016
JP 2017022787 1/2017
(Continued)

OTHER PUBLICATIONS

"International Preliminary Report on Patentability", Application No. PCT/US2019/025228, dated Oct. 22, 2020, 14 pages.
(Continued)

*Primary Examiner* — Brandon M Renner
(74) *Attorney, Agent, or Firm* — Colby Nipper PLLC

(57) ABSTRACT

This document describes methods, devices, systems, and means for fifth generation new radio uplink multiplexing assisted by shared grant-free transmission. A user equipment (UE) (111) inserts a first cyclical redundancy check (CRC) (504) into a transport block (TB) (502), encodes the TB (502), including the CRC (504), into a codeword (CW). Based on receiving a preemption indicator for part of a first physical resource (616), the UE (111) selects a first part of the CW for rate matching with a length based on a received uplink (UL) grant and the received preemption indicator. The UE (111) transmits the first part of the CW using the first physical resource (616), selects a second part of the CW, inserts a second CRC in the selected second part of the CW, and transmits the second part of the CW using a second physical resource (634).

10 Claims, 12 Drawing Sheets

(52) U.S. Cl.
CPC .......... *H04L 1/1845* (2013.01); *H04L 1/1864*
(2013.01); *H04L 5/0005* (2013.01); *H04L*
*5/0094* (2013.01)

(56) References Cited

U.S. PATENT DOCUMENTS

| | | | |
|---|---|---|---|
| 2016/0316418 A1* | 10/2016 | Torab Jahromi | H04L 47/17 |
| 2017/0257195 A1 | 9/2017 | Maaref | |
| 2018/0034596 A1 | 2/2018 | Noh et al. | |
| 2018/0041858 A1 | 2/2018 | Sheng et al. | |
| 2018/0159707 A1* | 6/2018 | Onggosanusi | H04L 1/0026 |
| 2018/0288682 A1* | 10/2018 | Manna | H04W 56/001 |
| 2019/0037585 A1* | 1/2019 | Li | H04L 5/0053 |
| 2019/0150179 A1* | 5/2019 | Soriaga | H04L 5/0053 370/329 |
| 2020/0028618 A1* | 1/2020 | Peng | H04L 5/0007 |
| 2020/0146036 A1* | 5/2020 | Gao | H04L 1/1819 |
| 2020/0153549 A1* | 5/2020 | Noh | H04L 1/0071 |

FOREIGN PATENT DOCUMENTS

| | | |
|---|---|---|
| JP | 2017520973 | 7/2017 |
| WO | 2017140344 | 8/2017 |
| WO | 2017217778 | 12/2017 |
| WO | 2019199515 | 10/2019 |

OTHER PUBLICATIONS

"Discussion on Handling UL Multiplexing of Transmissions with Different Reliability Requirements", 3GPP TSG RAN NG1 Meeting #92bis R1-1803848 Sanya, China, Apr. 16-20, 2018, 2018, 10 pages.
"EMBB Encoding Chain", 3GPP TSG-RAN WG1 NR R1-1706174 Spokane, USA, Apr. 3-7, 2017, Apr. 2017, 9 pages.
"International Search Report and Written Opinion", PCT Application No. PCT/US2019/025228, dated Aug. 21, 2019, 22 pages.
"Invitation to Pay Additional Fees", PCT Application No. PCTUS2019025228, dated Jun. 27, 2019, 17 pages.
"On UL Multiplexing Between eMBB and URLLC", 3GPP TSG-RAN WG1 Meeting #92 Athens, Greece, Feb. 26-Mar. 2, 2018, 2018, 6 pages.
"Foreign Office Action", JP Application No. 2020-543342, dated Jan. 4, 2022, 17 pages.
"Foreign Office Action", KR Application No. 10-2020-7023052, dated Oct. 23, 2021, 13 pages.
"Foreign Office Action", IN Application No. 202047033816, dated Nov. 15, 2021, 6 pages.
"On UL multiplexing between eMBB and URLLC", 3GPP TSG-RAN WG1 Meeting #92bis-R1-1804618, Apr. 2018, 6 pages.
"CB-group based retransmission for eMBB", 3GPP TSG RAN WG1 Meeting #88—R1-1702990, Feb. 2017, 9 pages.
"Communication under Rule 164", EP Application No. 19721889.4, May 2, 2022, 5 pages.
"Foreign Office Action", KR Application No. 10-2020-7023052, dated Apr. 6, 2022, 11 pages.
Clerckx, et al., "Is NOMA Efficient in Multi-Antenna Networks? A Critical Look at Next Generation Multiple Access Techniques", IEEE Open Journal of the Communications Society; vol. 2, Jan. 12, 2021, 26 pages.

* cited by examiner

FIFTH GENERATION NEW RADIO UPLINK MULTIPLEXING ASSISTED BY SHARED GRANT-FREE TRANSMISSION

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular networking, fixed wireless broadband, and the Internet of Things (IoT).

Fifth Generation New Radio (5G NR) supports three usage scenarios: enhanced Mobile Broadband (eMBB), Ultra-Reliable and Low Latency Communications (URLLC), and massive Machine-Type Communication (mMTC). URLLC has stringent requirements for high-reliability and low-latency communication. Therefore, 5G NR allows user equipment (UE) to transmit an URLLC signal over an already-scheduled resource when a 5G NR base station (e.g., g NodeB, or gNB) cannot schedule an individual resource to the URLLC user equipment for the URLLC transmission.

SUMMARY

This summary is provided to introduce simplified concepts of fifth generation new radio uplink multiplexing assisted by shared grant-free transmission. The simplified concepts are further described below in the Detailed Description. This summary is not intended to identify essential features of the claimed subject matter, nor is it intended for use in determining the scope of the claimed subject matter.

In some aspects, an electronic device is configured as a user equipment (UE) for fifth generation new radio (5G NR) communication. The UE is configured to insert a first cyclical redundancy check (CRC) into a transport block (TB), encode the TB, including the CRC, into a codeword (CW), receive a preemption indicator for part of a first physical resource, and select a first part of the CW for rate matching with a length based on a received uplink (UL) grant and the received preemption indicator. The UE is also configured to transmit the first part of the CW using the first physical resource, select a second part of the CW, insert a second CRC in the selected second part of the CW, and transmit the second part of the CW in a second physical resource.

In another aspect, a base station is configured to decode a first part of a codeword received from a user equipment, detect a second part of the received CW using a multi-user detector (MUD), determine if the decoding of the first part of the CW is successful, and based on the determination that the decoding of the first part of the CW is successful, send an acknowledgement (Ack) to the UE. Based on the determination that the decoding of the first part of the CW is not successful and the detection of the second part of the CW is successful, the base station is further configured to: combine the first part and the second part of the CW to form a combined CW, decode the combined CW, determine if the decoding of the combined CW is successful and, based on the determination that the decoding of the combined CW is successful, send an Ack to the UE. The base station is further configured to, based on either the decoding of the first part of the CW not being successful or the decoding of the combined CW not being successful, send a negative acknowledgement (Nck) to the UE.

In a further aspect, a method for non-orthogonal multiple access (NOMA) encoding in a transmitter of a user equipment (UE) is described that includes inserting, by the UE, a cyclical redundancy check (CRC) into a transport block (TB), encoding the TB, including the CRC, into a codeword (CW), receiving a preemption indicator for part of a first physical resource, and selecting a first part of the CW for rate matching with a length based on a received uplink (UL) grant and the received preemption indicator. The method further includes transmitting the first part of the CW in the first physical resource, selecting a second part of the CW, and transmitting the second part of the CW in a second physical resource.

In another aspect, a method for receiving a non-orthogonal multiple access decoding by a base station from a user equipment is described that includes decoding a first part of a codeword received from the UE, detecting a second part of the received codeword using multi-user detection that produces a first MUD outcome, and determining if the decoding of the first part of the CW is successful. The method further includes, based on the determining that the decoding of the first part of the CW is successful, sending an Ack to the UE, combining the first part and the second part of the CW to form a combined CW, decoding the combined CW, determining if the decoding of the combined CW is successful, and based on the determining that the decoding of the combined CW was successful, sending an acknowledgement (Ack) to the UE. The method further includes, based on the determining that the decoding of the combined CW is not successful, dropping the second part of the CW, combining the first part of the CW and another second part of the CW from a second MUD outcome to produce another combined CW, determining if the decoding of the other combined CW is successful, based on the determining that the decoding of the other combined CW is successful, sending an Ack to the UE, and if either the decoding of the other combined CW is not successful or no additional MUD outcomes are available, sending a Nck to the UE.

BRIEF DESCRIPTION OF THE DRAWINGS

The details of one or more aspects of fifth generation new radio uplink multiplexing assisted by shared grant-free transmission are described below. The use of the same reference numbers in different instances in the description and the figures may indicate like elements.

DETAILED DESCRIPTION

This document describes methods, devices, systems, and means for fifth generation new radio uplink multiplexing assisted by shared grant-free transmission. A user equipment (UE) inserts a first cyclical redundancy check (CRC) into a transport block (TB), encodes the TB, including the CRC, into a codeword (CW). Based on receiving a preemption indicator for part of a first physical resource, the UE selects a first part of the CW for rate matching with a length based on a received uplink (UL) grant and the received preemption indicator. The UE transmits the first part of the CW using the first physical resource, selects a second part of the CW, inserts a second CRC in the selected second part of the CW, and transmits the second part of the CW using a second physical resource.

When a first user equipment transmits an Ultra-Reliable and Low Latency Communications (URLLC) uplink signal over an already-scheduled resource, such as an enhanced Mobile Broadband (eMBB) uplink from a second UE, the scheduled eMBB uplink data may be punctured, canceled, or interrupted by the URLLC UL data transmission. In aspects, after receiving a schedule request (SR) from the first UE, a base station sends a preemption indicator to the second UE before the URLLC and eMBB data transmissions take place to cancel or interrupt the eMBB transmission. The second UE can cancel all or part of the eMBB transmission data according to the preemption indicator. The cancelation of the eMBB transmission provides guaranteed resources for high-reliability URLLC data transmission. The size of the URLLC data transmission is often much smaller than the size of the eMBB data transmission. If the second UE cancels the entire eMBB data transmission, the preemption procedure reduces the efficiency of utilization of the uplink resources.

If the eMBB uplink transmission is punctured by the URLLC transmission, both the first UE and the second UE transmit uplink data, and the URLLC transmission punctures a portion of the eMBB data transmission. In this case, the probability of errors in the received eMBB data will increase due to the puncturing by the URLLC transmission. By utilizing non-orthogonal multiple access (NOMA) encoding and Multi-User Detection (MUD) techniques, both UEs can transmit, error rates from transmission punctures are reduced, and network resources are used more efficiently.

Example Environment

Figure 1:
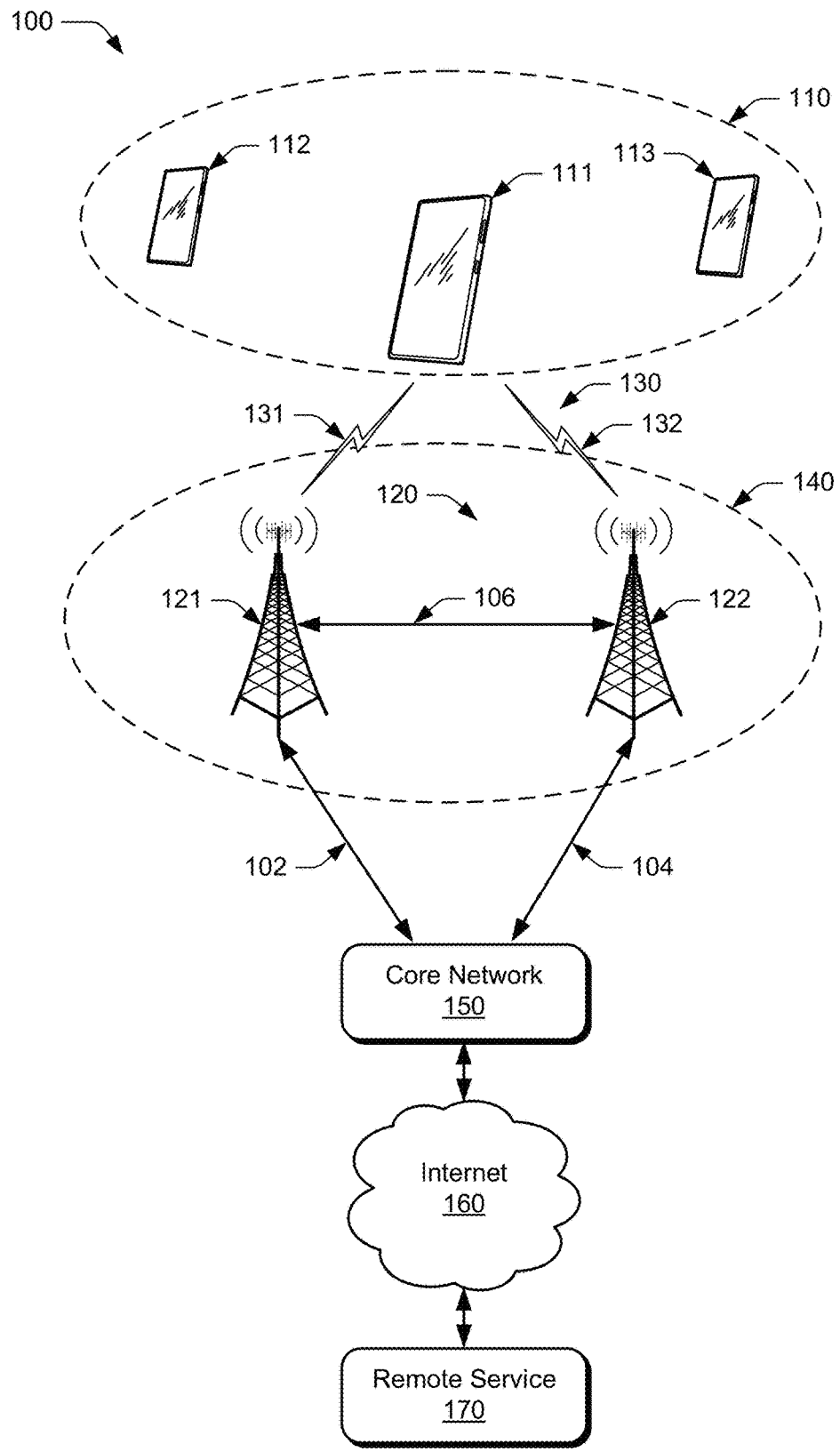
FIG. 1 illustrates an example wireless network environment in which various aspects of fifth generation new radio uplink multiplexing assisted by shared grant-free transmission can be implemented.

FIG. 1 illustrates an example environment 100 which includes multiple user equipment 110 (UE 110), illustrated as UE 111, UE 112, and UE 113 that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an Si interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
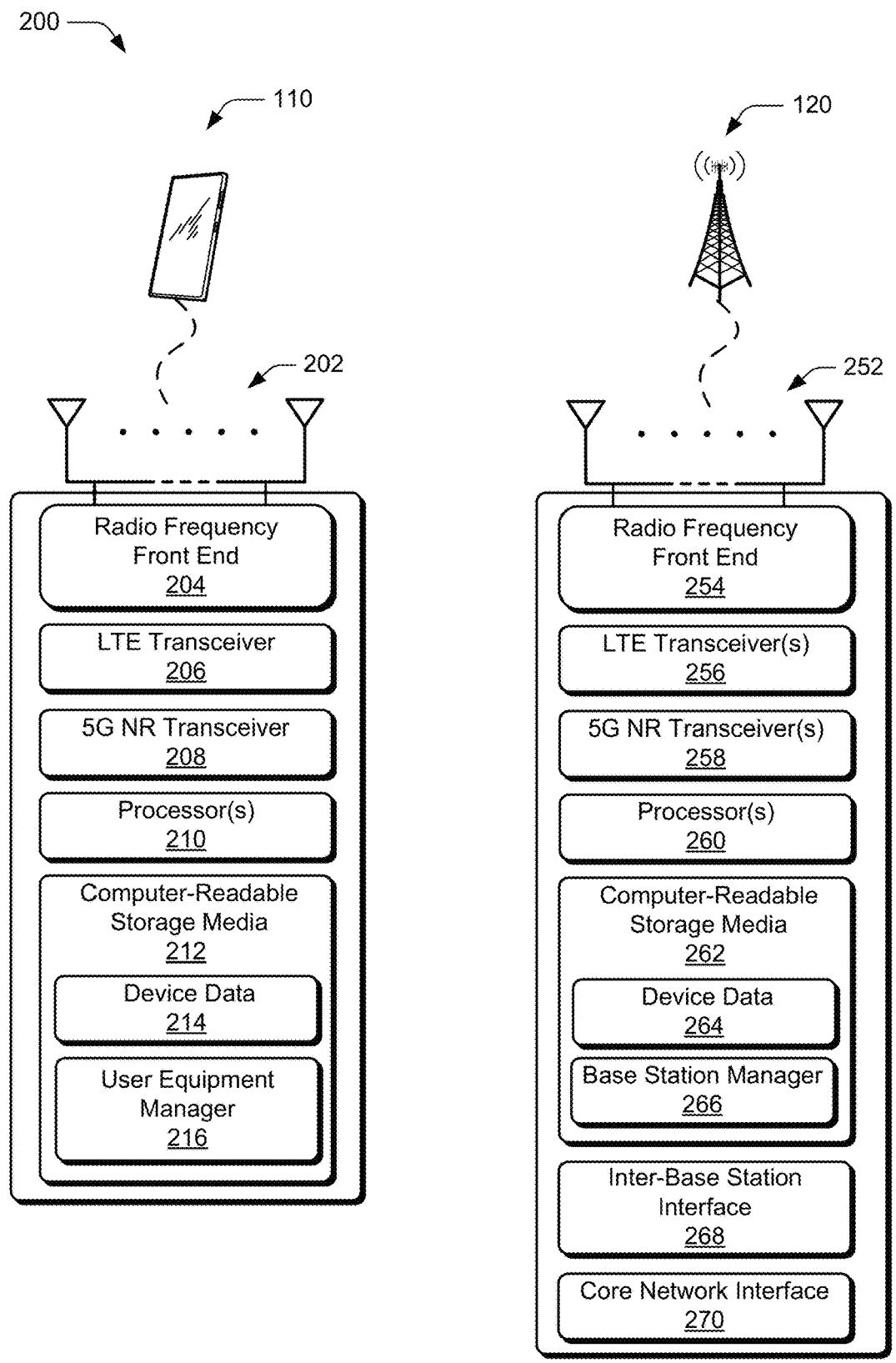
FIG. 2 illustrates an example device diagram that can implement various aspects of fifth generation new radio uplink multiplexing assisted by shared grant-free transmission.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a user equipment manager 216. The UE manager 216 can communicate with the antennas 202, the RF front end 204, the LTE transceiver 206, and/or the 5G NR transceiver 208 to monitor the quality of the wireless communication links 130 and initiate a beam search based on the monitored quality of the wireless communication links 130.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the user equipment 110, as well as communication with a core network, such as the core network 150.

The base stations 120 include an inter-base station interface 268, such as an Xn and/or X2 interface, which the base station manager 266 configures to exchange user-plane and control-plane data between other base stations 120, to manage the communication of the base stations 120 with the user equipment 110. The base stations 120 include a core network interface 270 that the base station manager 266 configures to exchange user-plane and control-plane data with core network functions and/or entities.

Figure 3:
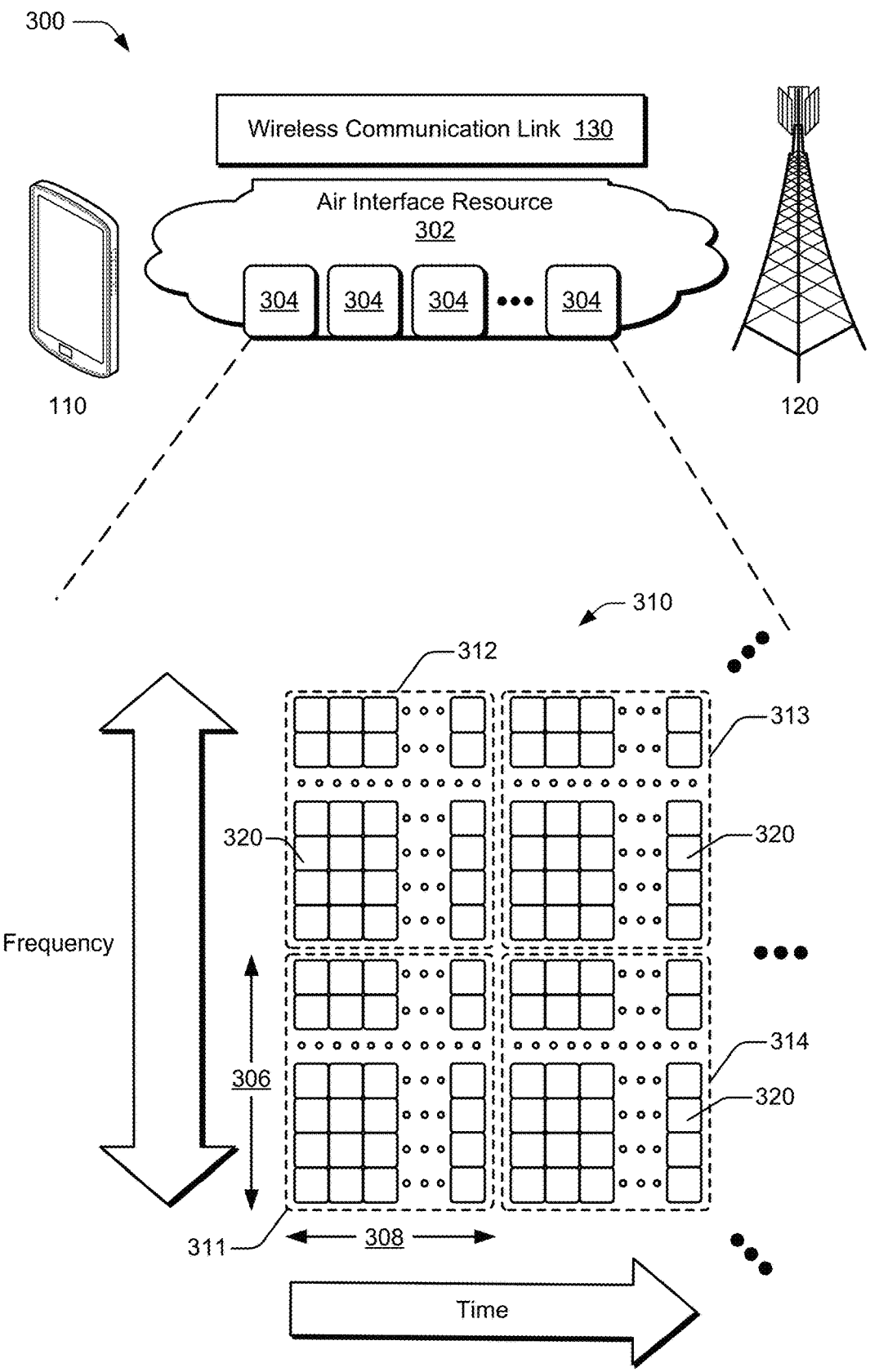
FIG. 3 illustrates an air interface resource that extends between a user equipment and a base station and with which various aspects of fifth generation new radio uplink multiplexing assisted by shared grant-free transmission techniques can be implemented.

FIG. 3 illustrates an air interface resource that extends between a user equipment and a base station and with which various aspects of reporting buffer status in wireless communication systems can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 304) of the air interface resource 302 for uplink and downlink communications. Each resource block 310 of network access resources may be allocated to support respective wireless communication link 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base station 120 through access provided by portions of the air interface resource 302. The base station manager 266 (not shown in FIG. 3) may determine a respective type or amount of information (e.g., data or control information) to be communicated (e.g., transmitted) by the user equipment 110. For example, the base station manager 266 can determine that each user equipment 110 is to transmit a different respective amount of information. The base station manager 266 then allocates one or more resource blocks 310 to each user equipment 110 based on the determined amount of information.

Additionally or alternatively, to block-level resource grants, the base station manager 266 may allocate resource units at an element-level. Thus, the base station manager 266 may allocate one or more resource elements 320 or individual subcarriers to different UEs 110. By so doing, one resource block 310 can be allocated to facilitate network access for multiple user equipment 110. Accordingly, the base station manager 266 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 266 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the resource manager can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, or both to communicate using the allocated resource units 304 of the air interface resource 302.

Uplink Multiplexing

Figure 4:
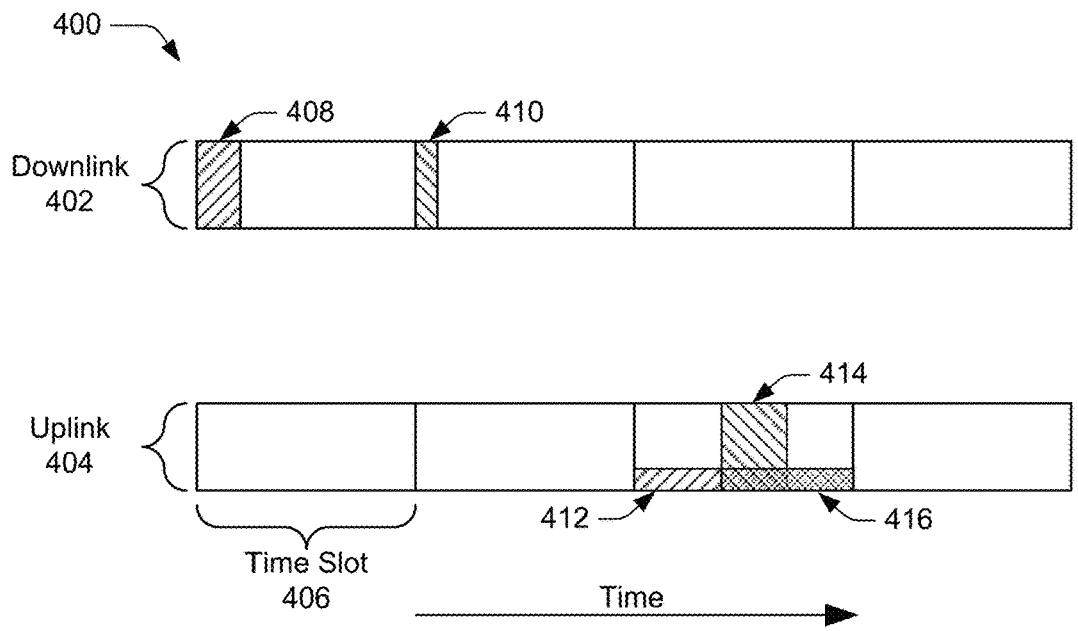
FIG. 4 illustrates an example of uplink preemption signaling in accordance with one or more aspects of fifth generation new radio uplink multiplexing assisted by shared grant-free transmission.

FIG. 4 illustrates an example of uplink preemption signaling in accordance with one or more aspects of fifth generation new radio uplink multiplexing assisted by shared grant-free transmission. A wireless link 130 is illustrated as a downlink (DL) 402 and an uplink (UL) 404, where the uplink 404 is a Physical Uplink Shard Channel (PUSCH). The downlink 402 and uplink 404 are divided into multiple time slots 406. In the first time slot of the downlink, a base station 120 grants UL resources to the UE 111 at 408 for transmission of eMBB data in a third UL slot. In a second downlink time slot, the base station 120 transmits an uplink preemption indication, at 410, that indicates that a second UE (the UE 112) will preempt a portion of the granted uplink resources for the eMBB transmission of the UE 111 for an URLLC transmission by the UE 112 in the third uplink time slot. The base station 120 starts to receive the eMBB transmission from the UE 111 at 412. The URLLC transmission 414 received by the base station 120 from the UE 112 punctures the eMBB transmission at 414, and the base station 120 receives the remainder of the eMBB transmission after the puncture at 416. Using power division multiplexing instead of rescheduling the eMBB transmission to avoid puncturing or transmitting a portion of the eMBB data during non-preempted portions of the slot increases the utilization of the uplink resource while also accommodating the real-time, low-latency requirements for URLLC communication.

One approach to increasing the utilization of the uplink resource during preemption is the application of multi-user detection (MUD) techniques to non-orthogonal multiple access (NOMA) signals. A NOMA receiver can adopt bit level detectors, such as a Message Passing Algorithm (MPA), an Estimation Propagation Algorithm (EPA), and/or a Belief Propagation (BP), or symbol level detectors, such as a Matched Filter (MF), an Elementary Signal Estimator (ESE) and/or a Linear Minimum Mean Square Error (LMMSE) estimator.

NOMA signal signatures can lower the interference among signals transmitted on a shared physical resource, thus increasing the channel capacity. MPA, EPA, and BP estimators can jointly cancel the interference, and ESE can suppress the interference (e.g., performing soft interference cancellation) by iteratively updating the log-likelihood-ratio (LLR) of the bit streams that have not successively decoded. In addition to the estimator, outer iterative algorithms such as Successive Interference Cancellation (SIC), Parallel Interference Cancellation (PIC), and/or Hybrid Interference Cancellation (HIC) can also enhance interference cancellation.

Figure 5:
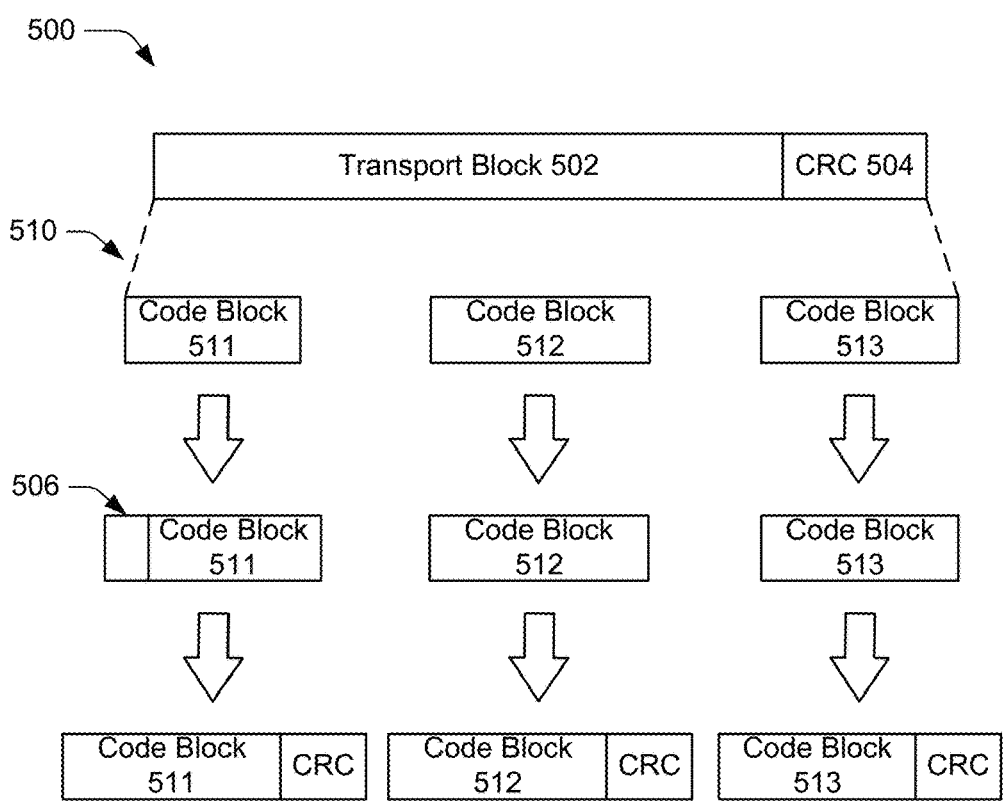
FIG. 5 illustrates an example of transport block to code block segmentation in accordance with one or more aspects of fifth generation new radio uplink multiplexing assisted by shared grant-free transmission.

FIG. 5 illustrates an example of coding a transport block for transmission in accordance with one or more aspects of fifth generation new radio uplink multiplexing assisted by shared grant-free transmission. In FIG. 5 for example, a transport block 502 is longer than the maximum length of a code block 510. The transport block 502 and a CRC block 504 for the transport block 502 are segmented into a number of code blocks 510, illustrated as code blocks 511, 512, and 513. Although the transport block 502 is illustrated as being segmented into three code blocks 510 in FIG. 5, any suitable number of code blocks 510 can be used to segment a transport block. If after segmenting the transport block 502, the code block 511 is shorter than the other code blocks 510, padding bits are prepended to the code block 511, at 506, so that all the code blocks 510 are the same length. Then a CRC is calculated for, and appended to, each code block 510 before sending the code blocks 510 to a channel coder.

Figure 6:
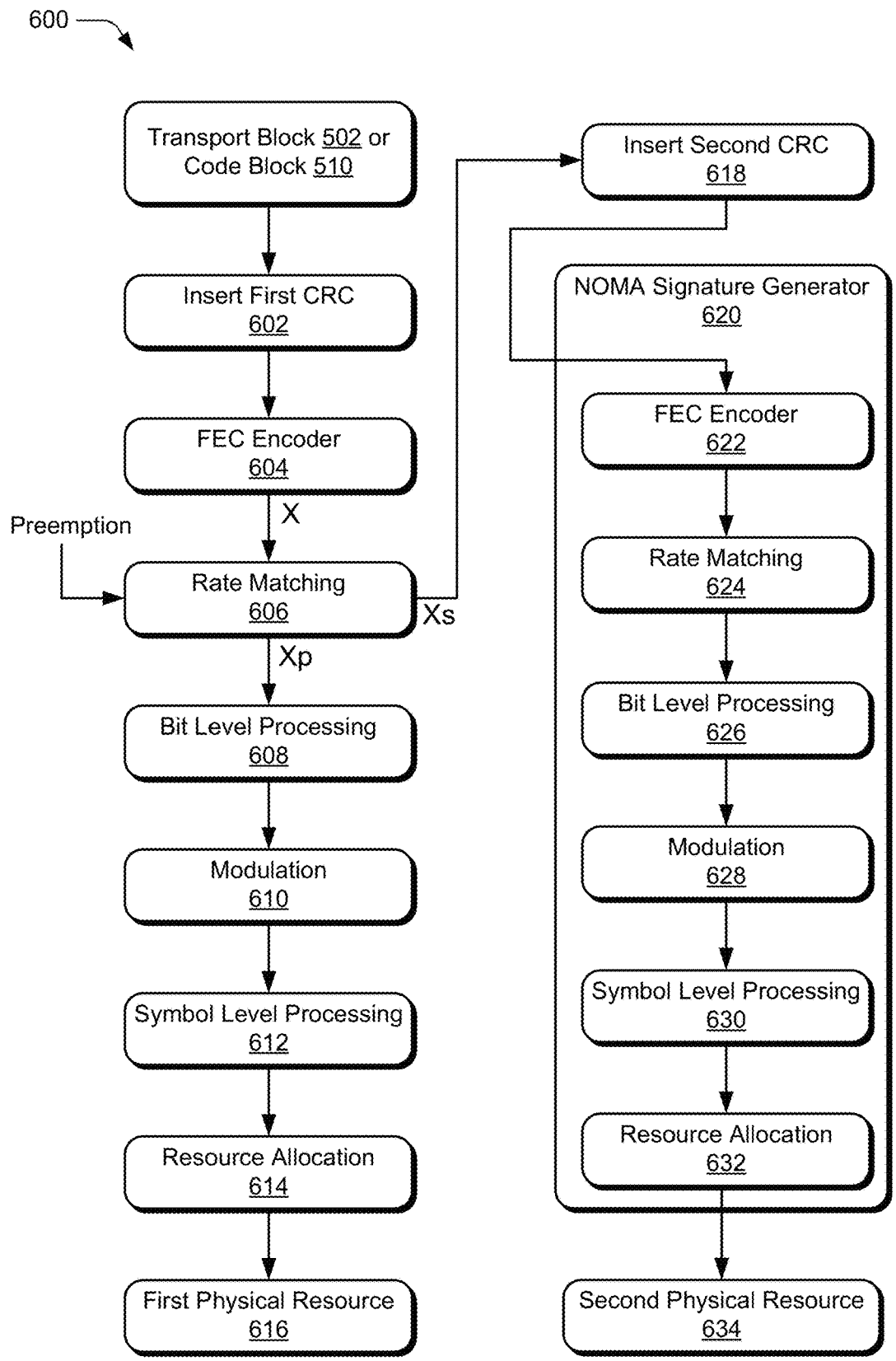
FIG. 6 illustrates an example transmitter design for non-orthogonal multiple access-assisted (NOMA-assisted) uplink multiplexing design in accordance with one or more aspects of fifth generation new radio uplink multiplexing assisted by shared grant-free transmission.

FIG. 6 illustrates an example transmitter 600 for NOMA-assisted uplink multiplexing using two cyclical redundancy checks in a UE 110. The transmitter receives the TB 502 or the CB 510 and, at 602, inserts a first CRC into the TB 502 or CB 510. In other words, the first CRC represents the CRC 504, or a CRC attached to CB 511, 512, or 513, depending on the length of the TB 502. The TB 502 or CB 510, including the CRC, is passed to a Forward Error Correction (FEC) encoder 604 to produce a codeword (CW) illustrated in FIG. 6 as "X." The codeword that is passed to a rate matching block 606. When the transmitter receives a pre-emption indication in the rate matching block 606, the bits in the CW are split into a first part ("Xp" in FIG. 6) and a second part ("Xs" in FIG. 6). The length of the first part of the CW is based upon the preemption indicator for rate matching. The first part includes the bits in the CW before the point of preemption and the second part of the CW includes the remaining bits of the CW.

The transmitter then transmits the first part of the CW ("Xp") in the preempted first physical resource 616. The transmission includes bit level processing 608, modulation 610, symbol level processing 612, and resource allocation 614 for the first part of the of the CW.

The UE 110 transmitter selects the second part of the CW ("Xs") and inserts a second CRC, at 618, for transmission using a shared grant-free resource (a second physical resource 634) according to a NOMA process. The transmitter passes the second part of the codeword and its associated CRC to a NOMA signature generator 620 and transmits the second portion of the CW based on the NOMA signature on a second physical resource 634. The NOMA signature generator 620 includes a FEC encoder 622, rate matching 624, bit level processing 626, modulation 628, symbol level processing 630, and resource allocation 632 for the second part of the of the CW.

The UE 110 can select an arbitrary starting point and length of the second part of the CW; however, the base station 120 has to know the starting point and the length of the second part of the CW to perform soft-combining. By the UE 111 selecting the preempted tail part from a circular buffer in the rate matching block, no additional information transmission is needed, otherwise, the UE 111 provides an explicit or implicit control signal to the base station 120.

Figure 7:
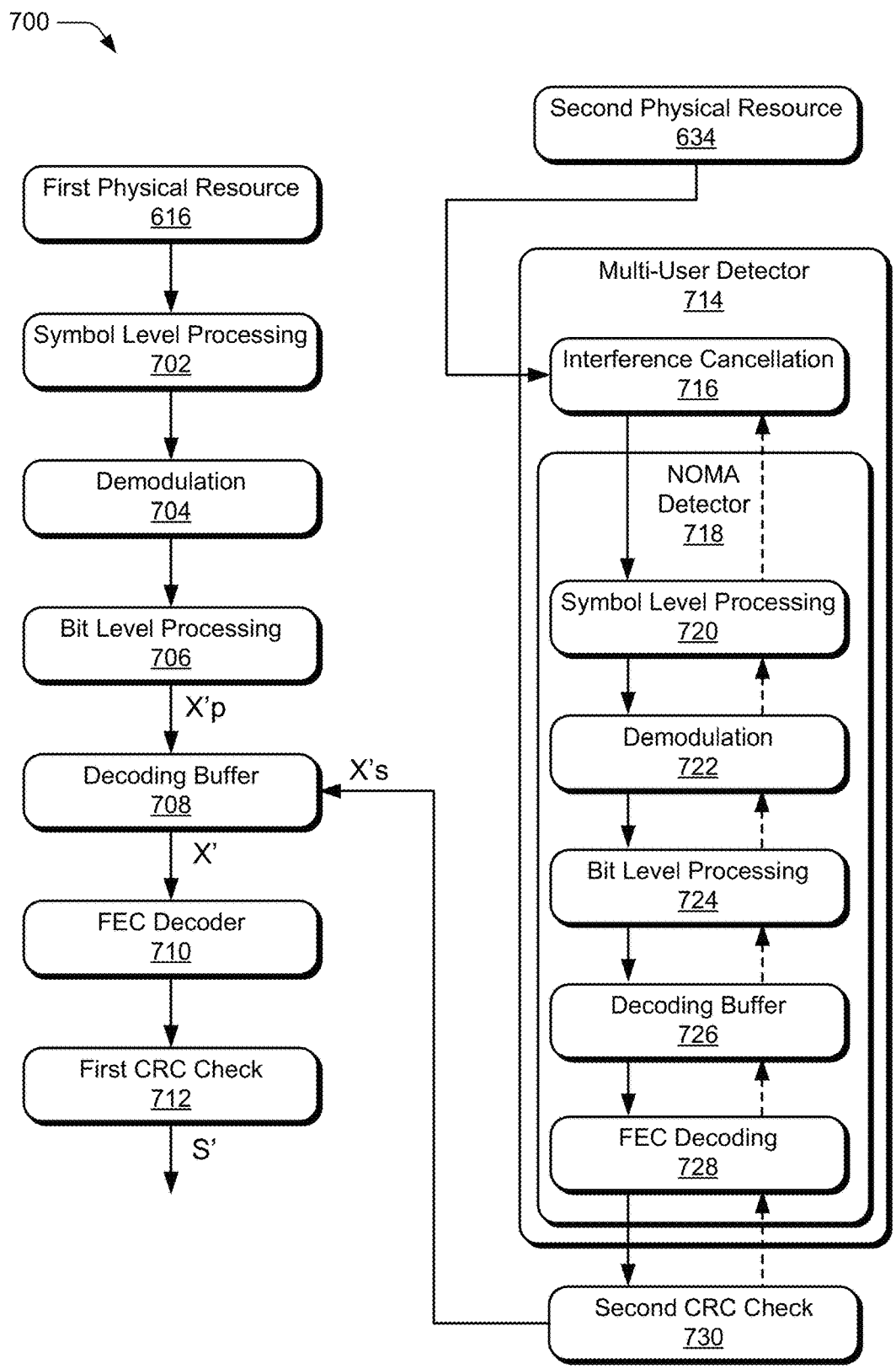
FIG. 7 illustrates an example receiver design for NOMA-assisted UL multiplexing in accordance with one or more aspects of fifth generation new radio uplink multiplexing assisted by shared grant-free transmission.

FIG. 7 illustrates an example receiver 700 for NOMA-assisted uplink multiplexing using two cyclical redundancy checks in the base station 120. At the base station 120, the first and second parts of the CW are received by the receiver. The first part of the CW is received using the first physical resource 616 and is processed through symbol level processing 702, demodulation 704, bit level processing 706, and the decoded bits (shown as "X'p" in FIG. 7) are held in a decoding buffer 708 for soft combining with a decoded second part of the CW.

The second part of the CW is received using the second physical resource 634 and is processed using MUD in the multi-user detector 714. The multi-user detector 714 includes interference cancellation 716 (interference canceler 716) and a NOMA detector 718 to produce decoded bits (shown as "X's" in FIG. 7) of the second part of the CW. The NOMA detector 718 includes symbol level processing 720, demodulation 722, bit level processing 724, buffering of the decoded bits in a decoding buffer 726, and FEC decoding 728. Successive interference cancellation feedback is provided to the interference cancellation block 716, as shown by the dashed lines in FIG. 7, after removal of the second CRC, to produce multiple MUD outcomes. Successive passes through the NOMA detector 718 are used to cancel interference to recover the second part of the CW.

When the NOMA detection is successful, as indicated by "X's" in FIG. 7, the decoded first part and second part of the CW are soft-combined in the decoding buffer 708. The decoding buffer 708 passes combined, decoded bits (shown as "X'" in FIG. 7) to a FEC decoder 710, the first CRC is removed by a first CRC check 712, and the data (shown as "S") is passed to upper layers of the protocol stack in the base station 120.

Figure 8:
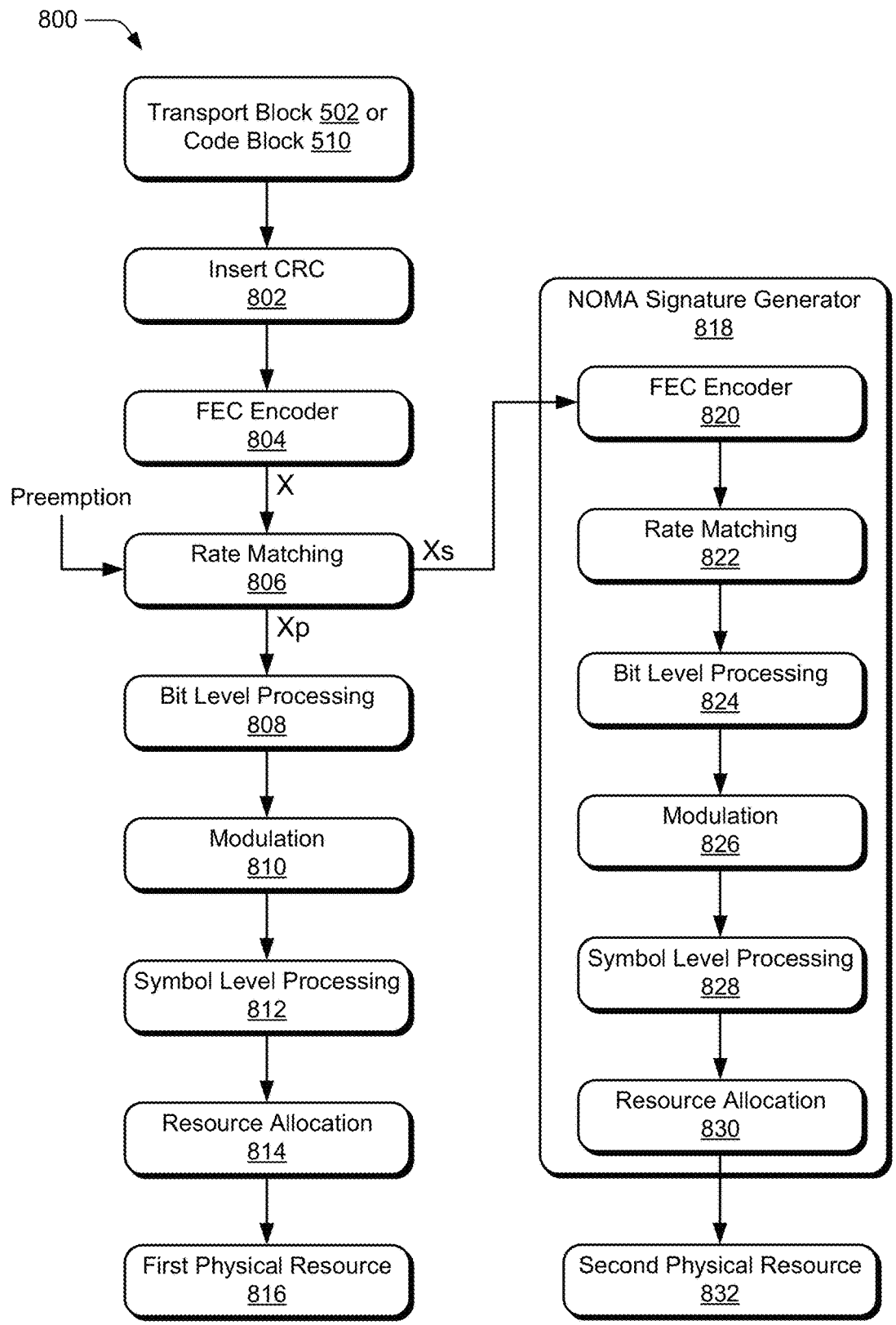
FIG. 8 illustrates another example transmitter design for NOMA-assisted uplink multiplexing design in accordance with one or more aspects of fifth generation new radio uplink multiplexing assisted by shared grant-free transmission.

FIG. 8 illustrates an example transmitter 800 for NOMA assisted uplink multiplexing using one cyclical redundancy check in a UE 110. In another aspect, a UE with a preempted transport block (TB) of eMBB data retransmits or parallel transmits a code block (CB) through a NOMA-shared resource using a single CRC. If the TB is longer than the length of a maximum code block, the TB is segmented into multiple CBs for transmission, as illustrated in FIG. 5. In this case, the single CRC represents the CRC 504, or a CRC attached to CB 511, 512, or 513, depending on the length of the TB 502.

The transmitter receives the TB 502 or the CB 510 and, at 802, inserts a first CRC into the TB 502 or CB 510. The TB 502 or CB 510, including the CRC, is passed to a Forward Error Correction (FEC) encoder 804 to produce a codeword (CW) illustrated in FIG. 8 as "X." The codeword is passed to a rate matching block 806. When the transmitter receives a preemption indication in the rate matching block 806, the bits in the CW are split into a first part ("Xp" in FIG. 8) and a second part ("Xs" in FIG. 8). The length of the first part of the CW is based upon the preemption indicator for rate matching. The first part includes the bits in the CW before the point of preemption and the second part of the CW includes the remaining bits of the CW.

The transmitter then transmits the first part of the CW ("Xp") in a preempted first physical resource 816. The transmission includes bit level processing 808, modulation 810, symbol level processing 812, and resource allocation 814 for the first part of the of the CW.

The UE 110 transmitter selects the second part of the CW ("Xs") for transmission using a shared grant-free resource (a second physical resource 832) according to a NOMA process. The transmitter passes the second part of the codeword to a NOMA signature generator 818 and transmits the second portion of the CW based on the NOMA signature on the second physical resource 832. The transmitter generates a NOMA signature and transmits the second portion of the CW based on the NOMA signature. The NOMA signature generator 818 includes a FEC encoder 820, rate matching 822, bit level processing 824, modulation 826, symbol level processing 828, and resource allocation 830 for the second part of the of the CW.

Figure 9:
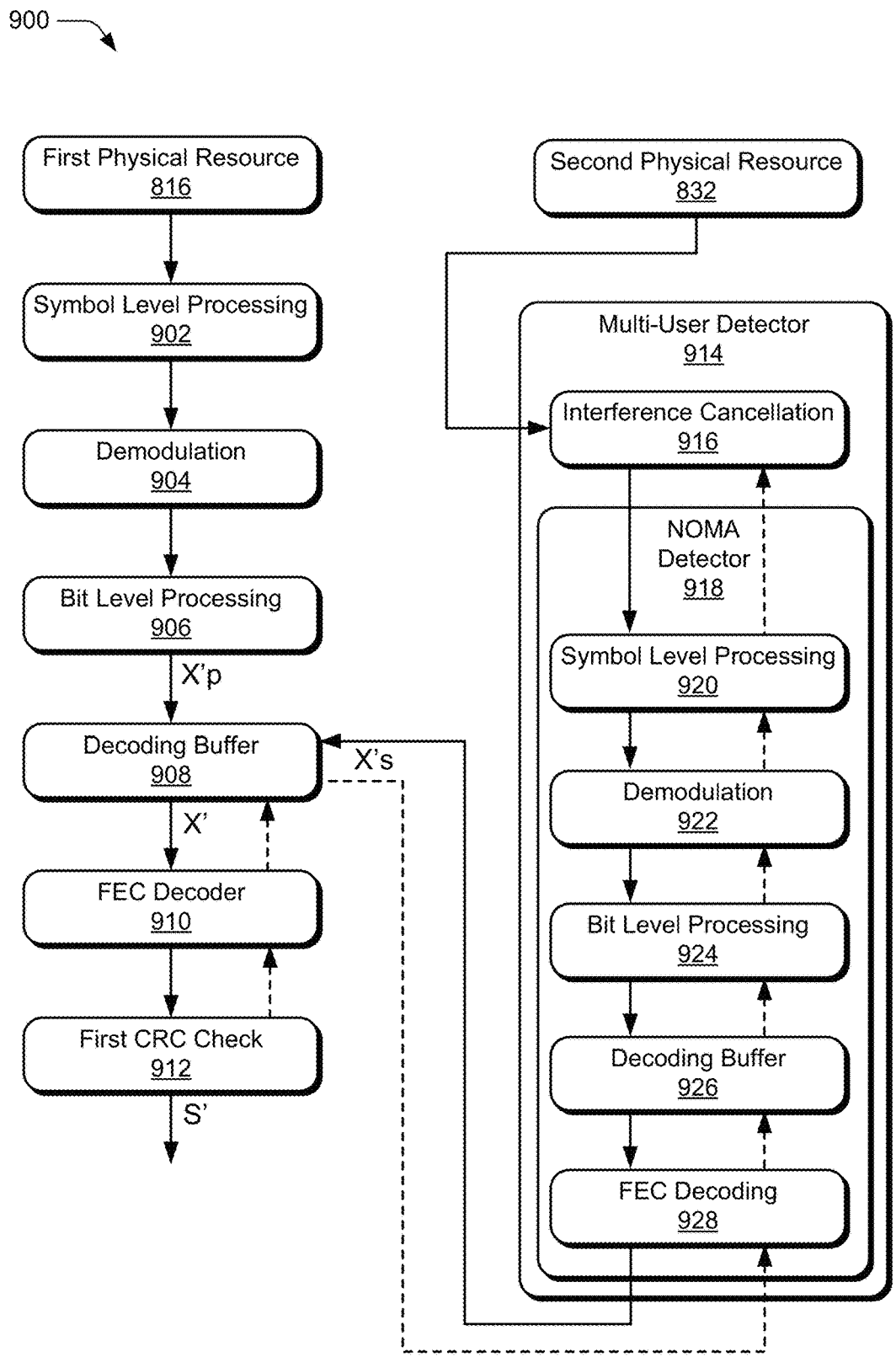
FIG. 9 illustrates another example receiver design for NOMA-assisted UL multiplexing in accordance with one or more aspects of fifth generation new radio uplink multiplexing assisted by shared grant-free transmission.

FIG. 9 illustrates an example receiver 900 for NOMA-assisted uplink multiplexing using one cyclical redundancy check in the base station 120. At the base station 120, the first and second parts of the CW are received by the receiver. The first part of the CW is received using the first physical resource 816 and is processed through symbol level processing 902, demodulation 904, bit level processing 906, and the decoded bits (shown as "X'p" in FIG. 9) are held in a decoding buffer 908 for soft combining with the decoded second part of the CW.

The second part of the CW is received using the second physical resource 832 is processed using multi-user detection (MUD) in the multi-user detector 914 that includes interference cancellation 916 (interference canceler 916) and a NOMA detector 918 to produce decoded bits (shown as "X's" in FIG. 9) of the second part of the CW. The NOMA detector 918 includes symbol level processing 920, demodulation 922, bit level processing 924, buffering of the decoded bits in a decoding buffer 926, and FEC decoding 928.

Successive interference cancellation feedback is provided to the interference cancellation block, as shown by the dashed lines in FIG. 9, to produce multiple MUD outcomes. Successive passes through the NOMA detector 918 are used to cancel interference to recover the second part of the CW. The FEC-decoded bits of the second part of the CW are soft-combined with the decoded bits of the first part of the CW in the decoding buffer 908. The decoding buffer 908 passes combined, decoded bits (shown as "X'" in FIG. 9) to a FEC decoder 910, the first CRC is removed by a first CRC check 912, and the result is supplied as successive interference cancellation feedback to the interference cancellation block 916 (as shown by the dashed lines in FIG. 9) to produce multiple MUD outcomes. When the NOMA detection is successful, the data (shown as "S'" in FIG. 9) is passed to upper layers of the protocol stack in the base station 120.

Example Methods

Example methods 1000-1300 is described with reference to FIGS. 10-13 in accordance with one or more aspects of fifth generation new radio uplink multiplexing assisted by shared grant-free transmission. The order in which the method blocks are described are not intended to be construed as a limitation, and any number of the described method blocks can be skipped or combined in any order to implement a method, or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
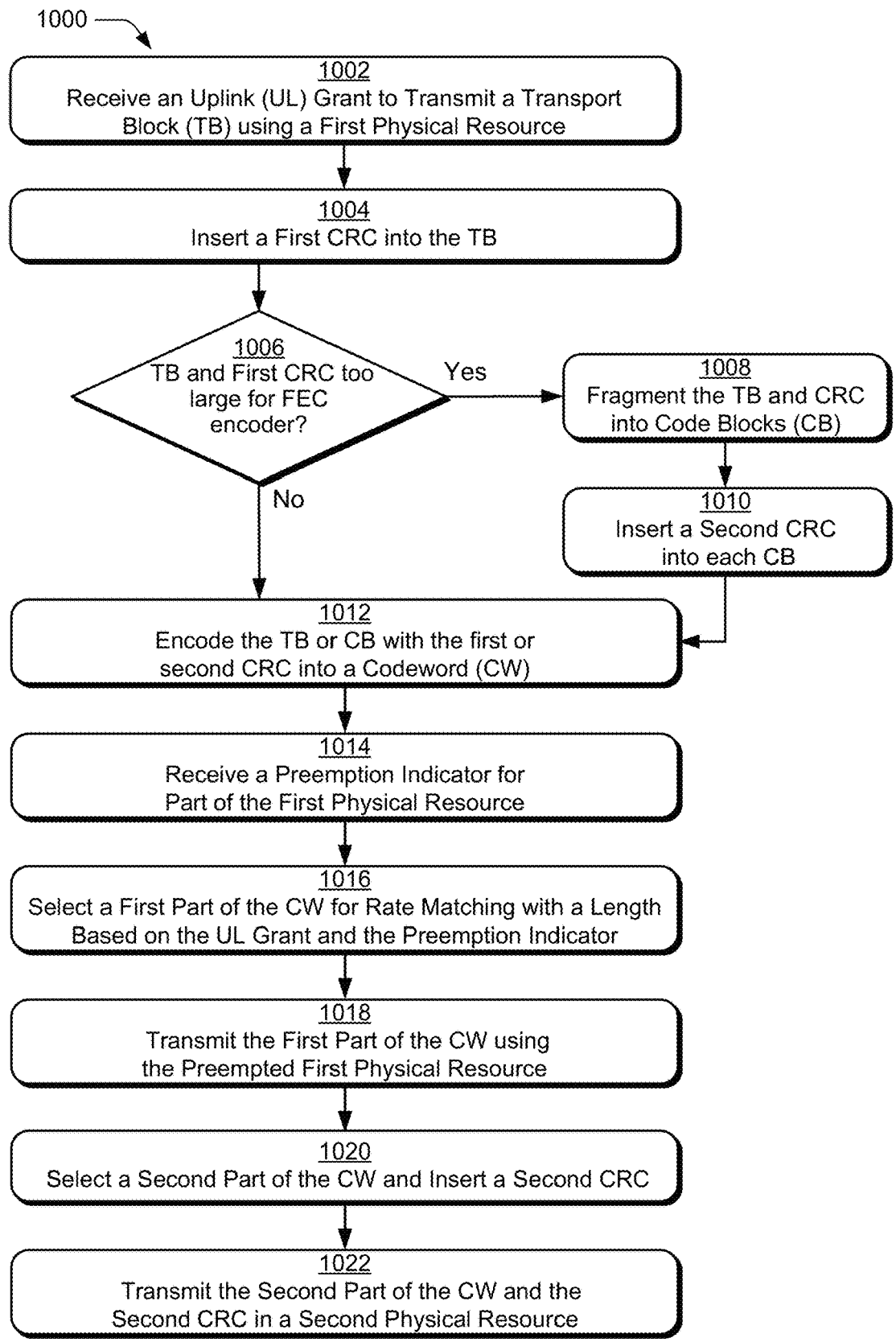
FIG. 10 illustrates an example method of fifth generation new radio uplink multiplexing assisted by shared grant-free transmission as generally related to encoding a transport block or code block for transmission by a user equipment in accordance with aspects of the techniques described herein.

FIG. 10 illustrates example method(s) 1000 of fifth generation new radio uplink multiplexing assisted by shared grant-free transmission as generally related to encoding a transport block or code block for transmission by a user equipment. At block 1002, a user equipment receives an uplink grant to transmit a transport block using a first physical resource. For example, the user equipment 110 receives an uplink grant from the base station 120 to transmit eMBB data using a first physical resource.

At block 1004, a first CRC is inserted into the transport block. For example, a CRC 504 is calculated for the TB 502 and inserted into the TB 502 as shown in FIG. 5.

At 1006, the UE determines if the TB is too large for a forward error correction (FEC) encoder and if the TB is too large for the forward error correction (FEC) encoder, the TB is fragmented into multiple code blocks (CB) at 1008. For example, the user equipment determines that the TB 502 of eMBB data is too large for the FEC encoder 604 and fragments the TB 502 into multiple CBs 510 for the FEC encoder 604.

At block 1010, the UE inserts a second CRC into each CB. For example, the user equipment inserts a CRC into each CB 510, as shown in FIG. 5.

At block 1012, the UE encodes the TB or CB, including the CRC, into a codeword (CW). For example, the user equipment encodes the TB 502 or CB 510, including the CRC, of the eMBB data into a CW.

At block 1014, the UE receives a preemption indicator for part of the first physical resource. For example, the user equipment receives a preemption indicator from the base station that an URLLC transmission will preempt part of the first physical resource 616 granted for the eMBB transmission.

At block 1016, the UE selects a first part of the CW for rate matching with a length based on the UL grant and the preemption indicator. For example, based on the UL grant and the preemption indicator received from the base station 120, the user equipment 111 selects a first part of the CW for rate matching.

At block 1018, the UE transmits the first part of the CW in the preempted first physical resource. For example, the UE 111 transmits the first part of the CW, the transmitting including bit level processing 608, modulation 610, symbol level processing 612, and resource allocation 614 for the first part of the of the CW.

At block 1020, the UE selects a second part of the CW and inserts a second CRC for the second part of the CW. For example, based on the UL grant and the preemption indicator received from the base station 120, the user equipment 111 selects a second part of the CW and generates a CRC for the second part and inserts the second CRC for rate matching. The UE 111 can select an arbitrary starting point and length for the second part of the CW or select the tail part from the circular buffer, in the rate matching block 606.

At block 1022, the UE transmits the second part of the CW in the second physical resource. For example, the UE transmits the second part of the CW that includes bit level processing 626, modulation 628, symbol level processing 630, and resource allocation 632 for the second part of the of the CW.

Figure 11:
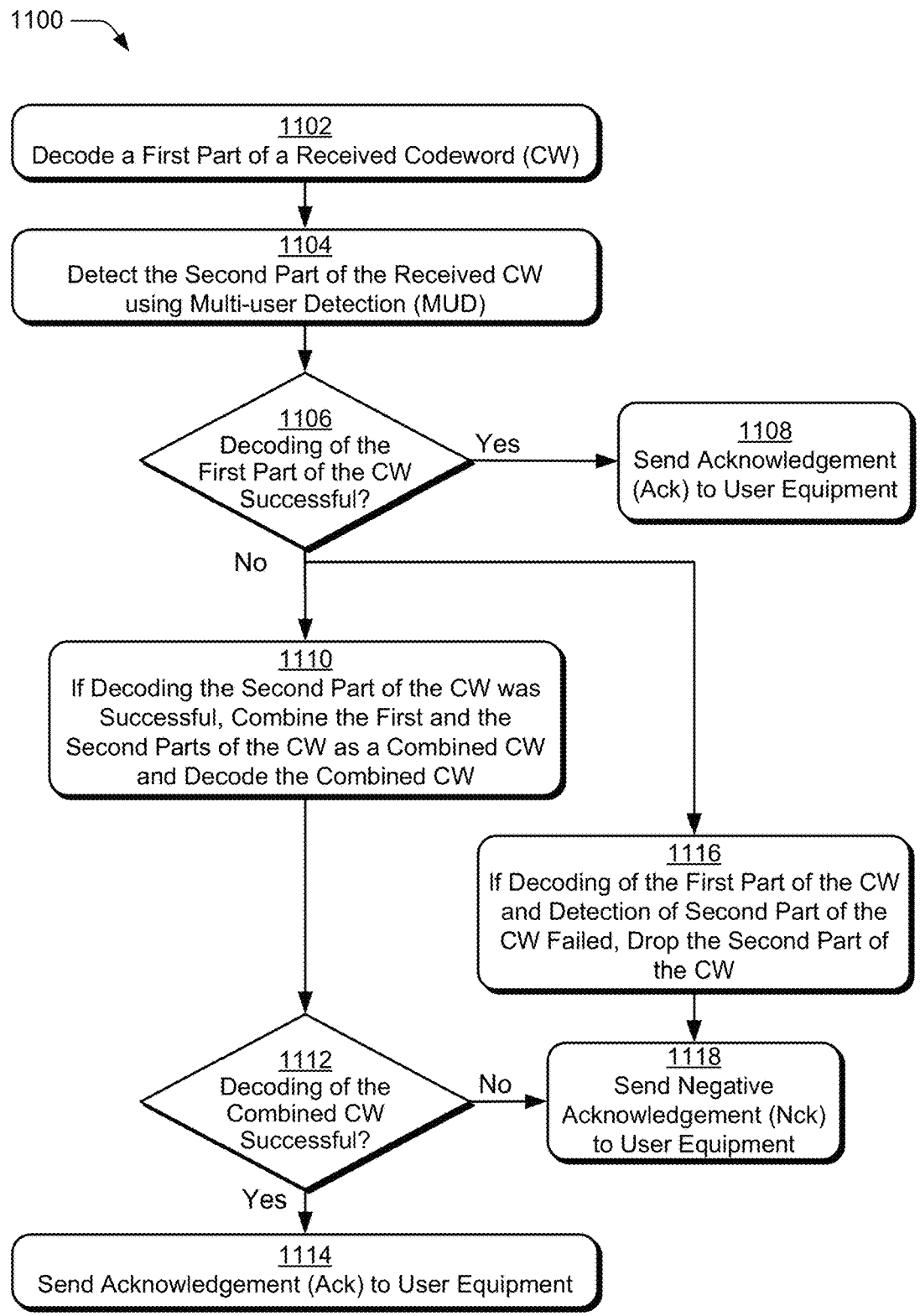
FIG. 11 illustrates an example method of fifth generation new radio uplink multiplexing assisted by shared grant-free transmission as generally related to decoding a transport block or code block by a base station in accordance with aspects of the techniques described herein.

FIG. 11 illustrates example method(s) 1100 of fifth generation new radio uplink multiplexing assisted by shared grant-free transmission as generally related to decoding a transport block or code block by a base station.

At block 1102, a base station decodes a first part of a codeword received from a UE. For example, the base station 120 receives a first part of a codeword that was transmitted by the user equipment 111 using a first physical resource 616. The reception and decoding includes symbol level processing 702, demodulation 704, bit level processing 706, and storage in a decoding buffer 708.

At block 1104, the base station detects a second part of the received codeword using multi-user detection. For example, the base station 120 receives a second part of the codeword that was transmitted by the user equipment using a second physical resource 634. The multi-user detector 714 applies Successive Interference Cancellation (SIC) using the result of decoding the second part of the CW after the second CRC is removed. The reception and decoding includes symbol level processing 720, demodulation 722, bit level processing 724, buffering 726, FEC decoding 728, and removal of a second CRC at the second CRC check 730.

At block 1106, the base station determines if the decoding of the first part of the CW is successful. For example, the base station 120 uses the first CRC to determine if the decoding of the first part of the CW was successful. Alternatively or additionally, the base station 120 drops the second part of the CW.

At block 1108, if the base station determines that the decoding of the first part of the CW was successful, the base station can send an acknowledgement (Ack) to the UE. For example, if the first CRC validates the decoding of the first part of the CW, the base station 120 transmits an Ack to the UE to indicate that the CW was successfully decoded. In an alternative example, if the first CRC validates the decoding of the first part of the CW, the base station 120 determines the CW was successfully decoded and goes to the next transmission without sending an acknowledgement (Ack) to the UE.

At block 1110, if the base station determines that the decoding of the second part of the CW was successful, the base station combines the first part and the second part of the CW to form a combined CW and decodes the combined codeword. For example, if the base station 120 determines that the decoding of the second part of the CW was successful, the first part and the second part of the CW are combined in the decoding buffer 708, and the combined codeword is FEC-decoded by the FEC decoder 710.

At block 1112, the base station determines whether the decoding of the combined codeword is successful or not. For example, the base station 120 uses the first CRC to determine if the decoding of the CW was successful.

At block 1114, if the base station determines that the decoding of the combined CW was successful, the base station can send an acknowledgement (Ack) to the UE. For example, if the first CRC validates the decoding of the combined CW, the base station 120 transmits an Ack to the UE 111 to indicate that the combined CW was successfully decoded. In an alternative example, if the first CRC validates the decoding of the combined CW, the base station 120 determines the CW was successfully decoded and goes to the next transmission without sending an acknowledgement (Ack) to the UE.

At block 1116, if the decoding of the first part of the CW or the detection of the second part of the CW fails, the base station drops the second part of the CW. For example, if based on the first CRC, the decoding of the first part of the CW failed, and based on the second CRC, the detection of the second part of the CW failed, the base station 120 drops the second part of the CW.

At block 1118, if the decoding of the combined CW failed, the base station can send a negative acknowledgement (Nck) to the UE. For example, if the first CRC does not validate the decoding of the combined CW or if the second CRC does not validate the detection of the second part of the CW, the base station 120 sends a Nck to the UE 111. In an alternative example, if the first CRC does not validate the decoding of the combined CW or if the second CRC does not validate the detection of the second part of the CW, the base station 120 sends an UL grant to the UE 111 for retransmission of the CW.

Figure 12:
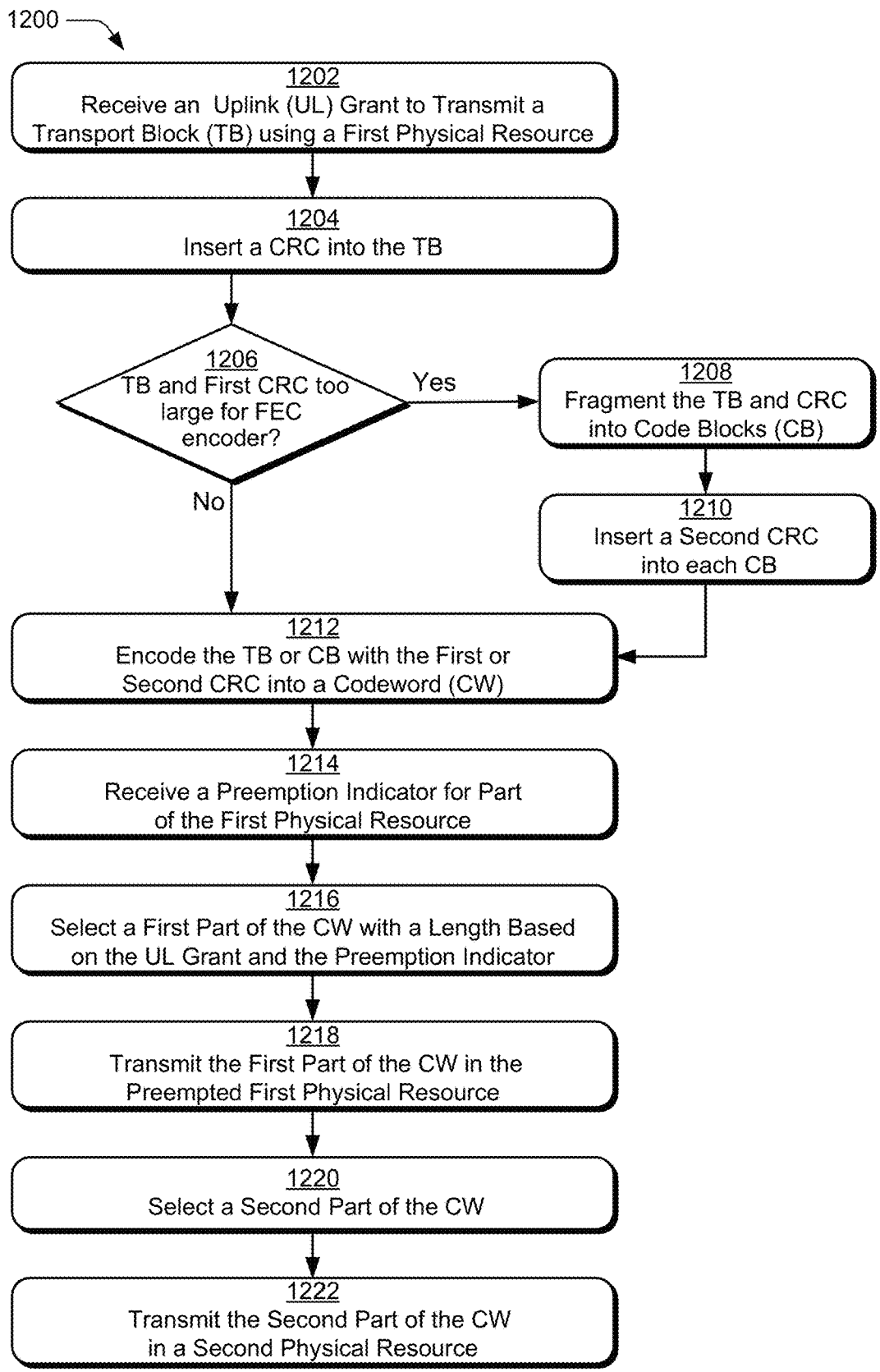
FIG. 12 illustrates an example method of fifth generation new radio uplink multiplexing assisted by shared grant-free transmission as generally related to encoding a transport block or code block for transmission by a user equipment in accordance with aspects of the techniques described herein.
Figure 13:
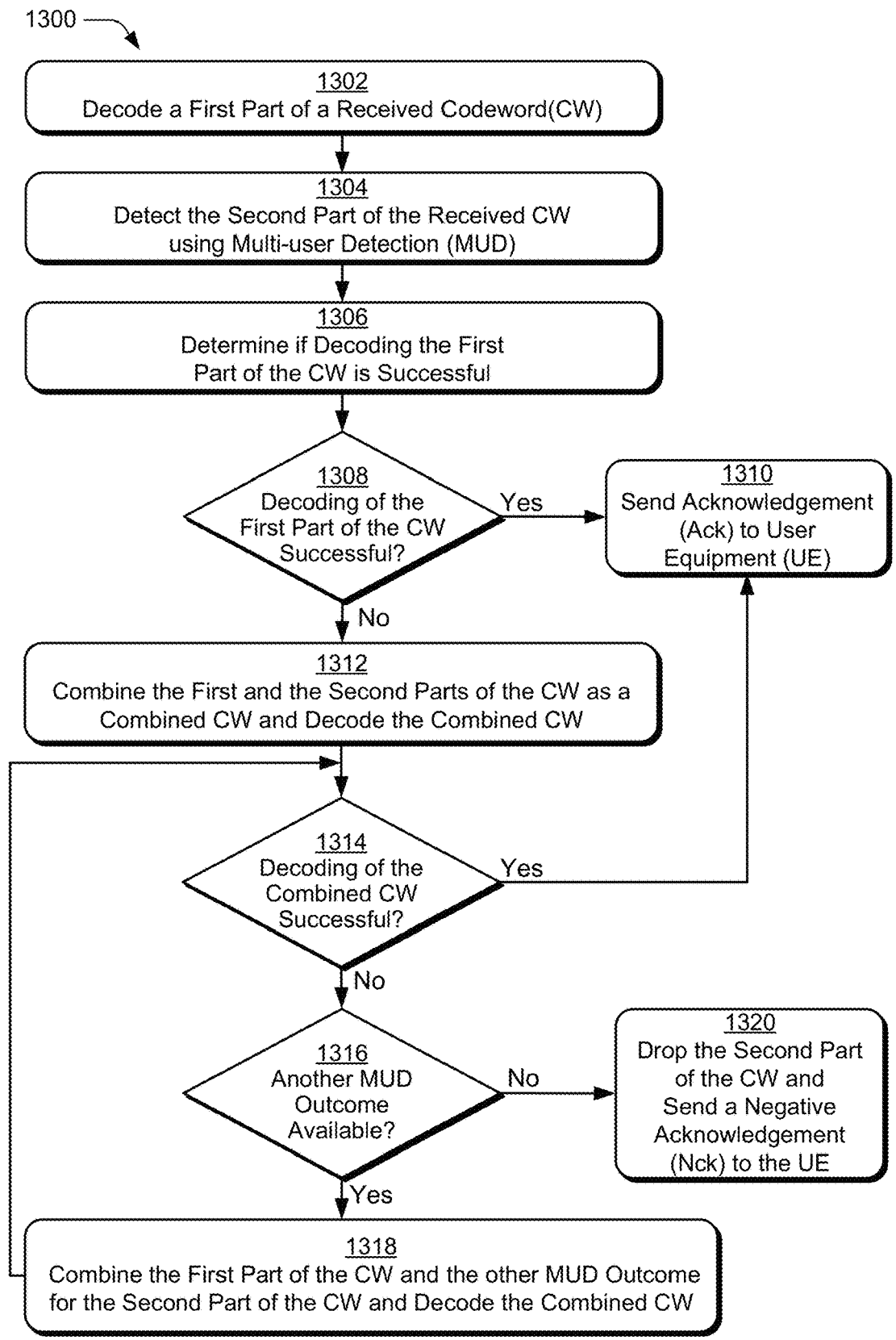
FIG. 13 illustrates an example method of fifth generation new radio uplink multiplexing assisted by shared grant-free transmission as generally related to decoding a transport block or code block by a base station in accordance with aspects of the techniques described herein.

FIG. 12 illustrates example method(s) 1200 of fifth generation new radio uplink multiplexing assisted by shared grant-free transmission as generally related to encoding a transport block or code block for transmission by a user equipment.

At block 1202, a user equipment (UE) receives an uplink (UL) grant to transmit a transport block (TB) using a first physical resource. For example, the user equipment 111 receives an uplink grant from a base station 120 to transmit eMBB data using a first physical resource 816.

At block 1204, a first CRC is inserted into the transport block. For example, a CRC 504 is calculated for the TB 502 and inserted into the TB 502 as shown in FIG. 5.

At block 1206, the UE determines if the TB is too large for a forward error correction (FEC) encoder, and if the TB is too large for the forward error correction (FEC) encoder, the TB is fragmented into multiple code blocks (CB) at 1208. For example, the user equipment 111 determines that the TB 502 of eMBB data is too large for the FEC encoder 804 and fragments the TB 502 into multiple CBs 510 for the FEC encoder 804.

At block 1210, the UE inserts a cyclical redundancy check (CRC) into the TB or CB. For example, the user equipment 111 inserts a CRC into the TB 502 or CB 510, as shown in FIG. 5.

At block 1212, the UE encodes the TB or CB, including the CRC, into a codeword (CW). For example, the user equipment 111 encodes the TB 502 or CB 510, including the CRC 504, of the eMBB data into a CW.

At block 1214, the UE receives a preemption indicator for part of the first physical resource. For example, the user equipment 111 receives a preemption indicator from the base station 120 that an URLLC transmission will preempt part of the first physical resource 816 granted for the eMBB transmission.

At block 1216, the UE selects a first part of the CW for rate matching with a length based on the UL grant and the preemption indicator. For example, based on the UL grant and the preemption indicator received from the base station 120, the user equipment 111 selects a first part of the CW for rate matching.

At block 1218, the UE transmits the first part of the CW in the preempted first physical resource. For example, the UE transmits the first part of the CW, the transmitting including bit level processing 808, modulation 810, symbol level processing 812, and resource allocation 814 for the first part of the of the CW.

At block 1220, the UE selects a second part of the CW. For example, based on the UL grant and the preemption indicator received from the base station 120, the user equipment 111 selects a second part of the CW for rate matching. The UE can select an arbitrary starting point and length for the second part of the CW or select the tail part from the circular buffer in the rate matching block.

At block 1222, the UE transmits the second part of the CW in the second physical resource. For example, the UE 111 transmits the second part of the CW that includes bit level processing 824, modulation 826, symbol level processing 828, and resource allocation 830 for the second part of the of the CW.

FIG. 1300 illustrates example method(s) 1300 of fifth generation new radio uplink multiplexing assisted by shared grant-free transmission as generally related to decoding a transport block or code block by a base station.

At block 1302, a base station decodes a first part of a codeword received from a UE. For example, the base station 120 receives a first part of a codeword that was transmitted by the user equipment 111 using a first physical resource 816. The reception and decoding includes symbol level processing 902, demodulation 904, bit level processing 906, and storage in a decoding buffer 908.

At block 1304, the base station detects a second part of a received codeword using multi-user detection to produce multiple MUD outcomes. For example, the base station 120 receives a second part of the codeword that was transmitted by the user equipment 111 using a second physical resource 832. The multi-user detector 914 applies Successive Interference Cancellation (SIC) using the result of decoding the combined first part and second part of the CW. The reception and decoding includes symbol level processing 920, demodulation 922, bit level processing 924, buffering 926, and FEC decoding 928.

At block 1306, the base station determines if the decoding of the first part of the CW is successful. For example, the base station 120 uses the cyclical redundancy check (CRC) to determine if the decoding of the first part of the CW was successful.

At block 1308, if the base station determines that the decoding of the first part of the CW was successful, the base station 120 can send an acknowledgement (Ack) to the UE, at block 1310. For example, if the first CRC validates the decoding of the first part of the CW, the base station 120 transmits an Ack to the UE 111 to indicate that the CW was successfully decoded. In an alternative example, if the first CRC validates the decoding of the first part of the CW, the base station 120 determines the CW was successfully decoded and proceeds to decoding the next transmission without sending an acknowledgement (Ack) to the UE.

At block 1312, if the base station determines the decoding of the first part of the CW was not successful (at block 1308), the base station combines the first part and the second part of the CW to form a combined CW and decodes the combined codeword. For example, if the base station 120 determines that the decoding of the first part of the CW was not successful, the first part and the second part of the CW are combined in the decoding buffer, and the combined codeword is FEC-decoded.

At block 1314, the base station determines if the decoding of the combined codeword is successful and if the decoding was successful, the base station can send an acknowledgement (Ack) to the UE, at the block 1010. For example, the base station 120 uses the CRC to determine if the decoding of the combined CW was successful and transmits the Ack to the UE 111 to indicate that the CW was successfully decoded. In an alternative example, if the CRC validates the decoding of the combined CW, the base station 120 determines the combined CW was successfully decoded and proceeds to decoding the next transmission without sending an acknowledgement (Ack) to the UE.

At block 1316, if the base station determines that the decoding of the combined CW was not successful at 1314, the base station determines if an additional MUD outcome is available. For example, if the CRC does not validate the decoding of the combined CW, the base station 120 determines if another MUD outcome is available, such as another attempt at successive interference cancellation.

At block 1318, if another MUD outcome is available, the base station combines the first part and the second part of the CW, produced by the other MUD outcome, to form a combined CW and decodes the combined codeword. For example, if the base station 120 determines that the decoding of the first part of the CW was successful, the first part and the second part of the CW from the other MUD outcome are combined in the decoding buffer 908 and the combined codeword is FEC-decoded by the FEC decoder 910. The process of blocks 1314, 1316, and 1318 is repeated until no additional MUD outcomes are available.

At block 1320, if decoding of the combined CWs from all of the MUD outcomes has failed, the base station can send a negative acknowledgement (Nck) to the UE. For example, if the CRC does not validate any of the decodings of the combined CWs, the base station 120 sends a Nck to the UE 111. In an alternative example, if the CRC does not validate any of the decodings of the combined CWs, the base station 120 sends an UL grant to the UE 111 for retransmission of the CW.

Although aspects of fifth generation new radio uplink multiplexing assisted by shared grant-free transmission have been described in language specific to features and/or methods, the subject of the appended claims is not necessarily limited to the specific features or methods described. Rather, the specific features and methods are disclosed as example implementations of fifth generation new radio uplink multiplexing assisted by shared grant-free transmission, and other equivalent features and methods are intended to be within the scope of the appended claims. Further, various different aspects are described, and it is to be appreciated that each described aspect can be implemented independently or in connection with one or more other described aspects.

In the following some examples are described—

Example 1

An electronic device configured as a user equipment for communication, the user equipment configured to:
  insert a first cyclical redundancy check into a transport block;
  encode the transport block, including the cyclical redundancy check, into a codeword;
  receive a preemption indicator for part of a first physical resource;
  select a first part of the codeword for rate matching with a length based on a received uplink grant and the received preemption indicator;
  transmit the first part of the codeword using the first physical resource;
  select a second part of the codeword;
  insert a second cyclical redundancy check in the selected second part of the codeword; and
  transmit the second part of the codeword using a second physical resource.

Example 2

The electronic device of example 1, the user equipment configured to: receive the uplink grant to transmit the transport block using the first physical resource.

Example 3

The electronic device of example 1 or 2, wherein the encoding the transport block, including the cyclical redundancy check, into the codeword comprises forward error correction encoding.

Example 4

The electronic device of at least one of the preceding examples, wherein the transmission of the second part of the codeword includes forward error correction encoding of the second part of the codeword and the second cyclical redundancy check.

Example 5

The electronic device of at least one of the preceding examples, wherein the first part of the codeword comprises bits in the transport block before the preemption and the second part of the codeword comprises bits in the transport block after the preemption.

Example 6

A base station configured to:
decode, by a receiver of the base station, a first part of a codeword received from a user equipment:
detect a second part of the received codeword using a multi-user detector;
determine if the decoding of the first part of the codeword is successful; and
1) based on the determination that the decoding of the first part of the codeword is successful, send an acknowledgement to the user equipment;
2) based on the determination that the decoding of the first part of the codeword is not successful and the detection of the second part of the codeword is successful:
combine the first part and the second part of the codeword to form a combined codeword;
decode the combined codeword;
determine if the decoding of the combined codeword is successful; and based on the determination that the decoding of the combined codeword is successful, send an acknowledgement to the user equipment; or
3) based on either the decoding of the first part of the codeword not being successful or the decoding of the combined codeword not being successful, send a negative acknowledgement to the user equipment.

Example 7

The base station of example 6, wherein the multi-user detector comprises an interference canceler and a non-orthogonal multiple access detector.

Example 8

The base station of example 7, wherein the non-orthogonal multiple access detector provides successive interference cancellation feedback to the interference canceler.

Example 9

The base station of at least one of the examples 6 to 8, wherein before combining the first part and the second part of the codeword to form the combined codeword, the receiver performs a cyclic redundancy check on the second part of the codeword to remove the cyclical redundancy check before the combining.

Example 10

The base station of at least one of the examples 6 to 9, wherein the multi-user detector includes a forward error correction decoder.

Example 11

A method for non-orthogonal multiple access encoding in a transmitter of a user equipment, the method comprising:

inserting, by the user equipment, a cyclical redundancy check into a transport block;
encoding the transport block, including the cyclical redundancy check, into a codeword;
receiving a preemption indicator for part of a first physical resource;
selecting a first part of the codeword for rate matching with a length based on a received uplink grant and the received preemption indicator;
transmitting the first part of the codeword using the first physical resource;
selecting a second part of the codeword; and
transmitting the second part of the codeword using a second physical resource.

Example 12

The method of example 11, further comprising:
receiving the uplink grant to transmit the transport block using the first physical resource.

Example 13

The method of example 11 or 12, wherein the encoding the transport block, including the cyclical redundancy check, into the codeword comprises forward error correction encoding.

Example 14

The method of at least one of the examples 11 to 13, wherein the transmitting the second part of the codeword includes forward error correction encoding of the second part of the codeword.

Example 15

The method of at least one of the examples 11 to 14, wherein the first part of the codeword comprises bits in the transport block before the preemption and the second part of the codeword comprises bits in the transport block after the preemption.

Example 16

A method of receiving a non-orthogonal multiple access decoding by a base station from a user equipment, the method comprising:
decoding, by the base station, a first part of a codeword received from a user equipment;
detecting a second part of the received codeword using multi-user detection that produces a first multi-user detection outcome;
determining whether the decoding of the first part of the codeword is successful;
1) based on the determining that the decoding of the first part of the codeword is successful, sending an acknowledgement to the user equipment; and
2) based on the determining that the decoding of the first part of the codeword is not successful:
combining the first part and the second part of the codeword to form a combined codeword;
decoding the combined codeword;
determining if the decoding of the combined codeword is successful; and based on the determining that the decoding of the combined codeword is successful sending an acknowledgement to the user equipment; or based on the determining that the decoding of the combined codeword is not successful:
dropping the second part of the codeword:
combining the first part of the codeword and another second part of the codeword from a second multi-user detection outcome to produce a second combined codeword;
determining if the decoding of the second combined codeword is successful; and based on the determining that the decoding of the second combined codeword is successful, sending an acknowledgement to the user equipment; or
if either the decoding of the second combined codeword is not successful or no additional multi-user detection outcomes are available, sending a negative acknowledgement to the user equipment.

Example 17

The method of example 16, wherein the detecting using the multi-user detection comprises interference cancellation and non-orthogonal multiple access detection.

Example 18

The method of example 17, wherein the non-orthogonal multiple access detection provides successive interference cancellation feedback.

Example 19

The method of at least one of the examples 16 to 18, wherein the detecting using the multi-user detection includes forward error correction decoding.

Example 20

The method of at least one of the examples 16 to 19, further comprising forward error correction decoding the combined codeword.

What is claimed is:

1. An electronic device configured as a user equipment for communication, the UE comprising:
a processor; and
memory comprising instructions executable by the processor to configure the electronic device to:
insert, into a transport block, a first cyclical redundancy check calculated for the transport block;
forward error correction encode the transport block, including the first cyclical redundancy check, into a codeword;
receive a preemption indicator for part of a first physical resource;
rate-match using a first part (Xp) of the codeword with a length based on a received uplink grant and the received preemption indicator;
transmit the first part of the codeword using the first physical resource;
select a second part (Xs) of the codeword, the second part including bits of the transport block remaining after selecting the first part;
insert, in the selected second part of the codeword, a second cyclical redundancy check calculated for the second part of the codeword; and
transmit the second part of the codeword using a second physical resource.

2. The electronic device of claim 1, the instructions executable to configure the electronic device to:
receive the uplink grant to transmit the transport block using the first physical resource.

3. The electronic device of claim 1, wherein the transmission of the second part of the codeword includes forward error correction encoding of the second part of the codeword and the second cyclical redundancy check.

4. The electronic device of claim 1, wherein the first part of the codeword comprises bits in the transport block before the preemption and the second part of the codeword comprises bits in the transport block after the preemption.

5. The electronic device of claim 1, the instructions executable to configure the electronic device to:
perform rate matching on the selected the second part (Xs) of the codeword.

6. A method for non-orthogonal multiple access encoding in a transmitter of a user equipment, the method comprising:
inserting, into a transport block, a cyclical redundancy check calculated for the transport block;
forward error correction encoding the transport block, including the cyclical redundancy check, into a codeword;
receiving a preemption indicator for part of a first physical resource;
rate-matching using a first part (Xp) of the codeword with a length based on a received uplink grant and the received preemption indicator;
transmitting the first part of the codeword using the first physical resource;
selecting a second part (Xs) of the codeword, the second part including bits of the transport block remaining after selecting the first part;
inserting, in the selected second part of the codeword, a second cyclical redundancy check calculated for the second part of the codeword; and
transmitting the second part of the codeword using a second physical resource.

7. The method of claim 6, further comprising:
receiving the uplink grant to transmit the transport block using the first physical resource.

8. The method of claim 6, wherein the transmitting the second part of the codeword includes forward error correction encoding of the second part of the codeword.

9. The method of claim 6, wherein the first part of the codeword comprises bits in the transport block before the preemption and the second part of the codeword comprises bits in the transport block after the preemption.

10. The method of claim 6, further comprising:
performing rate matching on the selected the second part (Xs) of the codeword.

* * * * *